L. R. NELSON.
NOZZLE.
APPLICATION FILED FEB. 11, 1908.
926,435.
Patented June 29, 1909.
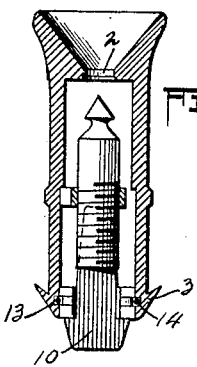
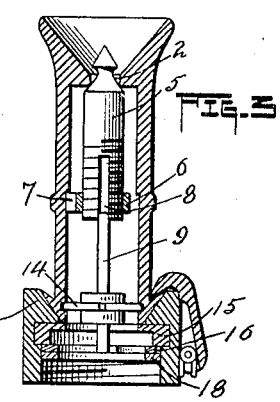
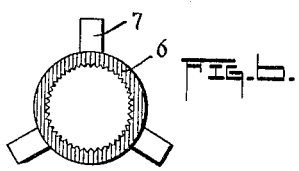
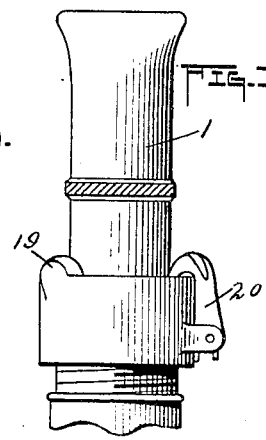
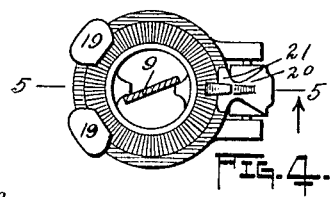
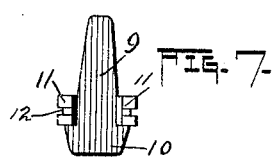
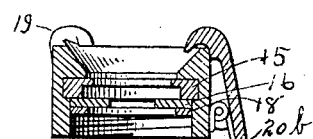
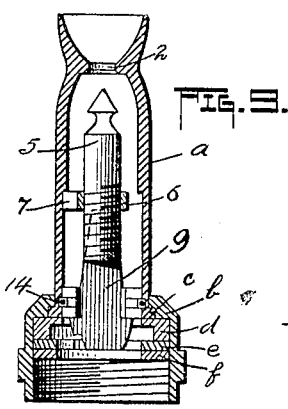
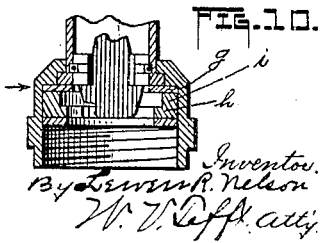
Witnesses:-
Inventor.

UNITED STATES PATENT OFFICE.

LEWEN R. NELSON, OF PEORIA, ILLINOIS.

NOZZLE.

No. 926,435.  Specification of Letters Patent.  Patented June 29, 1909.

Application filed February 11, 1908. Serial No. 415,291.

*To all whom it may concern:*

Be it known that I, LEWEN R. NELSON, a citizen of the United States, residing at Peoria, in the county of Peoria and State of Illinois, have invented certain new and useful Improvements in Nozzles; and I do hereby declare that the following is a full, clear, and exact description of the invention, which will enable others skilled in the art to which it appertains to make and use the same.

My invention relates to certain new and useful improvements in nozzles, whereby a nozzle stem is provided which is simple in construction, durable and cheap in first cost.

More particularly, my invention has reference to a hose nozzle capable of ready adjustment to adapt it to throw a spray or a solid stream and is very easily manipulated for that purpose.

My invention relates also to means for accomplishing a ready attachment and detachment of the nozzle stem from the sleeve forming a part of the nozzle, without the use of threaded connections.

That my invention may be more fully understood, reference is had to the accompanying drawings, in which—

Figure 1 is a side elevation showing my invention connected with a hose pipe. Fig. 2 is a sectional view showing in elevation a portion of my improved nozzle and detailed parts thereof. Fig. 3 is also a sectional view through the nozzle showing details of construction. Fig. 4 is a plan view of the coupling sleeve. Fig. 5 is a sectional view of the same. Fig. 6 is a detailed view showing a plan of a threaded collar provided with radially disposed lugs. Fig. 7 is a detailed view of a reach or stop. Fig. 8 is a stop plate. Fig. 9 is a sectional view showing a modified form of embodiment of my invention. Fig. 10 is also a sectional view of my invention showing a modified form of embodiment of the same.

In the drawings, 1 is a nozzle stem in form substantially as I prefer to construct the same, it being provided with a flared outward end, and having the opening 2 as shown, the interior bore thereof being made in two diameters as shown. The lower portion is provided with a tapered shoulder 3 adapting it for engagement with the tapered depression in the sleeve 4. 5 is the valve suitably formed at its upper end to be projected within the opening 2 in the forward end of the nozzle stem, a short distance, but the main body of the same being of larger dimensions than that of the opening. The valve is threaded as shown and is adapted to be carried within the threaded sleeve 6 having the radially disposed lugs 7. This sleeve is adapted to be supported as shown with the lugs engaging the wall of the nozzle stem and to remain in fixed position. The valve is slotted as at 8 and is adapted to be engaged by the reach or stop 9 which extends downwardly and is broadened at its base as at 10 as best shown in Figs. 2 and 7, and is provided with laterally extending shoulders 11, having circular form, adapted to fit within the lower portion of the nozzle stem and within such shoulders are provided the circularly formed grooves 12, the lower portion of the interior bore of the nozzle stem being also provided with circular groove at at 13 adapted to match with the grooves in the shoulders of reach 9.

14 is an open ring preferably formed of round brass wire and is best shown in Fig. 3 and is of such size that when compressed within the grooves 12 which are of sufficient depth to completely embrace the wire ring, it may be inserted within the lower end of the nozzle stem but will spring outwardly when in juxtaposition to engage the said groove 13 in the nozzle stem, the depth of the groove 13 being such that when the ring is seated therein, the interior edge thereof will project beyond the interior face of the bore sufficiently to support the reach or stop 9 in such a manner that it may be readily turned thereon, thereby providing a simple and a very efficient support for the reach or stop and also providing a means of assembling of the very simplest character.

15 is a rubber washer formed with interiorly extending lips thinner than the main body of the washer which are adapted to bear over the joint formed between the matching shoulders on the nozzle stem and the sleeve. The interior wall of the opening in the sleeve 4 is recessed as best shown in Figs. 3 and 5 to form a seat for the washer 15.

16 is a stop plate adapted to be supported in contact with the lower edge of washer 15 and is provided with the stop projections 17 (best shown in Fig. 8), this stop plate 16 being adapted to engage the lower end of the finger 9 in the manner best shown in Fig. 4.

18 is a rubber washer adapted to bear against the stop plate 16 to hold the same in place.

The lower portion of the interior of sleeve 4 is threaded as shown to facilitate engagement with with the ordinary hose connection.

To facilitate the connection of the nozzle stem 1 with the sleeve 4, the lugs 19 are provided upon the upper edge of sleeve 4, the same being inturned and suitably formed to engage the upper face of the shoulders 3 upon the nozzle stem.

20 is a dog having a pivotal connection with a stud on the sleeve and is suitably held under coil spring tension to cause the same to bear toward the sleeve and is provided with a hooked upper end adapted to engage with the upper face of the shoulder 3 of the nozzle stem. The connection between the nozzle stem and the sleeve is accomplished by hooking the shoulder 3 of the nozzle stem under the lugs 19 of the sleeve, then seating the base of the nozzle stem within the tapered circular opening in the top of the sleeve, then causing the dog 20 to engage with the shoulder 3 upon the nozzle stem. It will be observed that the connection between the nozzle stem and the sleeve is such that the nozzle stem may be readily turned with the application of a very small amount of force and it will also be observed that the connection between the finger 9 and the valve 5 is such that as the nozzle stem is turned, the valve will be projected forwardly within the nozzle stem or retracted readily, by means of the threaded connection between the valve and collar 6, according to the direction of movement of the nozzle stem, and that the valve will be held against circular movement by the stop or reach 9 bearing within the slot therein, and that the stop or reach 9 will be held against movement through the engagement of the lower part thereof with the stops 17—17 upon the stop plate 16.

Referring to Figs. 3 and 4 of the drawings, the particular construction of the dog 20 may be seen in which it will be observed that the tension spring is coiled about the pintle connection between the studs of the dog and the sleeve, while the loop bears underneath the rear end of the dog, with the free ends thereof extending downwardly and bearing against the outer face of the sleeve, thereby providing a very compact means for effecting the desired tension on the dog. The ears 21 are provided at the upper end of the dog adapted for engagement to release the dog from its engagement with the shoulder 3, likewise the dog may be provided with a tail portion shown in Fig. 5 upon which pressure may be applied to accomplish the release. The use of the washer 15 provided with the thin lips at its inner edge and not being under the pressure that is sustained by the thicker shoulder portion, will provide such a bearing against the lower end of the stem 1 as would permit it to turn readily, also the pressure of the water into the nozzle would cause the thin edges of the washer to be pressed up against the joint between the sleeve and the stem in such a manner as to make a perfect closure against leakage.

In Fig. 9 of the drawing, I have shown a modified form of connection between the nozzle stem and the coupling sleeve. In this figure, $a$ represents the nozzle stem, $b$ the coupling sleeve, the lower extremity of the nozzle stem being formed with the shoulder $c$ and the opening in the upper portion of the interior of the sleeve is made to conform with the outer circumference of the nozzle stem and is suitably recessed to receive the shoulder to form a close joint. $d$ is a washer of the same form as that previously described as being used in connection with my invention, provided with inwardly projecting thin lips adapted to bear over the joint between the shoulder of the nozzle stem and the sleeve. $e$ is a stop plate in forming the same, as shown in Fig. 5 of the drawings, and $f$ is an ordinary rubber washer. In this construction, the nozzle stem is suitably formed to adapt it to be inserted through the sleeve and consequently is of somewhat different form at its upper end than that shown in the other figures. The valve and its manner of support within the nozzle stem and the stop or reach 9 with its means of support and manner of connection with the nozzle stem are the same as described and shown in connection with the other figures of the drawing.

In Fig. 10, there is also shown a slight modification of my invention. In this figure, the nozzle stem and sleeve are connected in the same manner as in Fig. 9, but in this figure $g$ is a plain rubber washer adapted to bear over the joint between the nozzle stem connection with the sleeve. $h$ is a stop plate in form the same as shown in Fig. 8 except that there is provided the upwardly projecting shoulder $i$ which bears against the outer portions of the washer $g$, thus allowing the force of the water to be applied to the inner edge of the rubber washer to cause it to be forced up close against the joint between the nozzle stem and the sleeve. Either of these modified forms may be used with good results.

In carrying out my invention, the sleeve may be formed with exterior corrugations, or may be otherwise formed on the portion thereof adapted to receive the hose pipe instead of providing the same with threads, and in such event, the washer would have to be inserted through the top part of the sleeve at the portion where the nozzle stem is adapted to be attached and in such use lugs may be cast within the sleeve below the washer or packing seat to form a stop for the reach 9, and in such use and form it will be desirable to form the sleeve in two parts provided with threads at the point indicated by the arrow in Fig. 10 whereby the parts may be separated so that the parts necessary to be contained within the sleeve may be readily inserted.

I claim—

1. In a device of the class described, a nozzle stem having an interior bore, a valve supported within the stem, a reach having a movable relation with the valve, and separate means connecting the reach with the stem in a turnable relation.

2. In a device of the class described, a nozzle stem having an interior bore, a valve, means for supporting the valve within the stem, a reach within the stem, the reach having a movable relation with the valve and a rotatable relation with the relatively stationary part within the stem.

3. In a device of the class described, a nozzle stem having an interior bore, a slotted valve supported within the stem a reach having a slidable relation within the valve and a rotatable relation with the relatively stationary projection within the stem, said projection being separate from the means supporting the valve.

4. In a device of the class described, the combination of a sleeve and stem having an interior bore, means for interlocking the stem and the sleeve together, a valve within the stem, means for connecting the valve with the stem, a stop within the sleeve, a reach connecting the valve with the stop and separate means connecting the reach with the stem in a turnable relation.

5. In a device of the class described, the combination of a nozzle stem, a valve within the stem, a reach having an adjustable relation with the valve and means for connecting the reach with the stem in a turnable relation.

6. In a device of the class described, a nozzle comprising a sleeve conically formed at one end around the opening therein, a nozzle stem provided with a tapered base adapted to fit the conically formed part within the sleeve and provided with a shoulder thereon, clamping means for uniting the sleeve and stem in a detachable and turnable relation, a slotted valve within the stem and a stop plate within the sleeve and means turnably supported in the stem connecting the valve with the stop plate.

7. In a device of the class described, the combination with a nozzle stem, a slotted valve reciprocally supported therein, of a reach turnably supported in the nozzle stem and having slidable relation with the valve and a stop to limit the turning of the reach.

8. In a device of the class described, the combination with a nozzle stem, a slotted valve reciprocally supported therein, of a sleeve swivelly connected with the nozzle stem, a reach supported by the nozzle stem and having a slidable relation with the valve, and a stop within the sleeve to limit the turning of the reach.

9. In a device of the class described, a nozzle comprising a sleeve and a stem having a detachable and swivel relation, a slotted valve supported within the stem, a stop within the sleeve and a reach supported within the nozzle stem and connecting the valve and the stop.

10. In a device of the class described, a nozzle comprising a sleeve and a stem having a detachable and rotatable relation, the stem having an opening at its upper end and having a circumferential groove at the lower end of its interior bore, a slotted valve suitably held for backward and forward movement therein with the turning thereof, a closure washer and a fixed stop plate within the sleeve, a reach having shoulder extensions having peripheral slots, a spring wire adapted to engage the groove in the stem and the slots in the shoulders of the reach, the upper end of the reach adapted to engage the slot in the valve and the lower end engageably connected with the stop plate in the sleeve.

In testimony whereof I have affixed my signature, in presence of two witnesses.

LEWEN R. NELSON.

Witnesses:
  H. V. GIBSON,
  MARY E. COMEGYS.